United States Patent [19]

Fraser

[11] Patent Number: 5,434,914
[45] Date of Patent: Jul. 18, 1995

[54] NAME TRANSLATION IN COMMUNICATIONS NETWORKS

[75] Inventor: Alexander G. Fraser, Bernardsville, N.J.

[73] Assignee: AT&T Corp., Murray Hill, N.J.

[21] Appl. No.: 999,336

[22] Filed: Dec. 31, 1992

[51] Int. Cl.[6] .......................... H04M 3/42; H04M 7/00
[52] U.S. Cl. .................................... 379/219; 379/210; 379/211; 379/213; 379/207; 379/220; 379/221
[58] Field of Search ............... 379/201, 207, 210, 211, 379/212, 220, 221, 213, 219

[56] References Cited

U.S. PATENT DOCUMENTS

| | | | |
|---|---|---|---|
| 4,191,860 | 3/1980 | Weber | 179/18 |
| 4,310,727 | 1/1982 | Lawser | 379/207 |
| 4,348,554 | 9/1982 | Asmuth | 379/207 |
| 4,694,396 | 9/1987 | Weisshaar et al. | 364/300 |
| 4,706,081 | 11/1987 | Hart et al. | 340/825.03 |
| 4,811,388 | 3/1989 | Westerhof et al. | 379/221 |
| 4,924,510 | 5/1990 | Le | 379/221 |
| 5,025,491 | 6/1991 | Tsuchiya et al. | 370/94.1 X |
| 5,253,288 | 10/1993 | Frey et al. | 379/221 |
| 5,255,315 | 10/1993 | Bushnell | 379/207 X |
| 5,259,026 | 11/1993 | Johnson | 379/213 |
| 5,274,696 | 12/1993 | Perelman | 379/235 X |
| 5,293,376 | 3/1994 | White | 379/207 X |
| 5,311,572 | 5/1994 | Friedes et al. | 379/211 X |

OTHER PUBLICATIONS

P. Mockapetris and J. Postel, "A Perspective on Name System Design," IEEE INFOCOM, 349 (1985).
L. L. Peterson, "A Yellow-Pages Service for a Local-Area Network," CACM Special Issue, 235-242 (Aug. 11-13, 1987).
E. C. Cooper, "Replicated Distributed Programs," in Operating Systems Review, vol. 19, No. 5, 63-78 (1985).
B. Miller, "Process Migration in DEMOS/M", in: Proceedings of the 9th ACM Symposium on Operating Systems Principles, vol. 17, No. 5, pp. 110-119, 10-13 Oct. 1983.

Primary Examiner—James L. Dwyer
Assistant Examiner—Daniel Hunter
Attorney, Agent, or Firm—Gordon E. Nelson

[57] ABSTRACT

Apparatus and methods used in a network for translating names into network addresses. Source nodes in the network receive names and have name caches for translating the names; destination nodes have local name tables containing correspondences between names and the network addresses served by the destination node. Them is further a name server accessible to the nodes which contains current correspondences between names and network addresses. A name is translated by first presenting it to the name cache in a source node; if there is no entry for the name in the cache, name cache maintenance code in the source node obtains information about the name from the name server; once there is an entry, the name is translated and a call set up message containing the name and the network address is sent to the destination node, which checks whether the name and network address are its local name table. If they are, the destination node returns a call complete message to the source node. Otherwise, it returns an unknown destination message to the source node. The name cache maintenance code responds to the unknown destination message by invalidating the cache entry and obtaining the correct information from the name server.

15 Claims, 2 Drawing Sheets

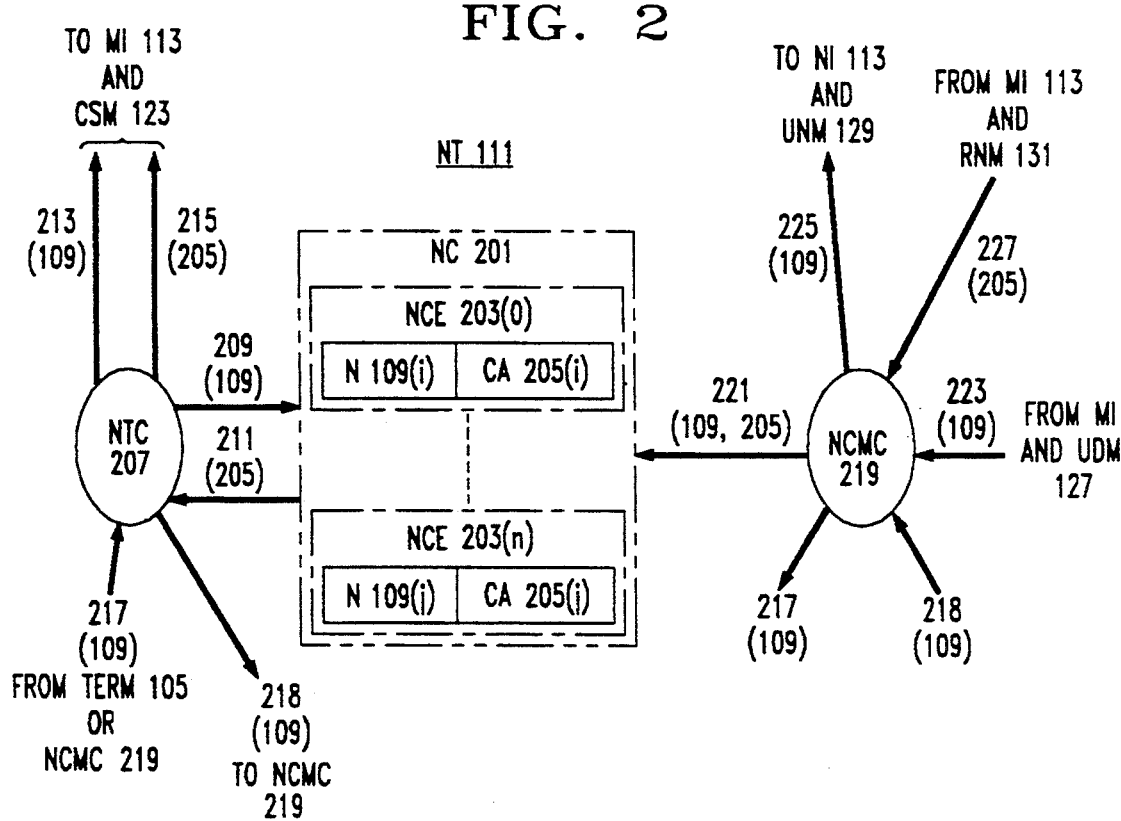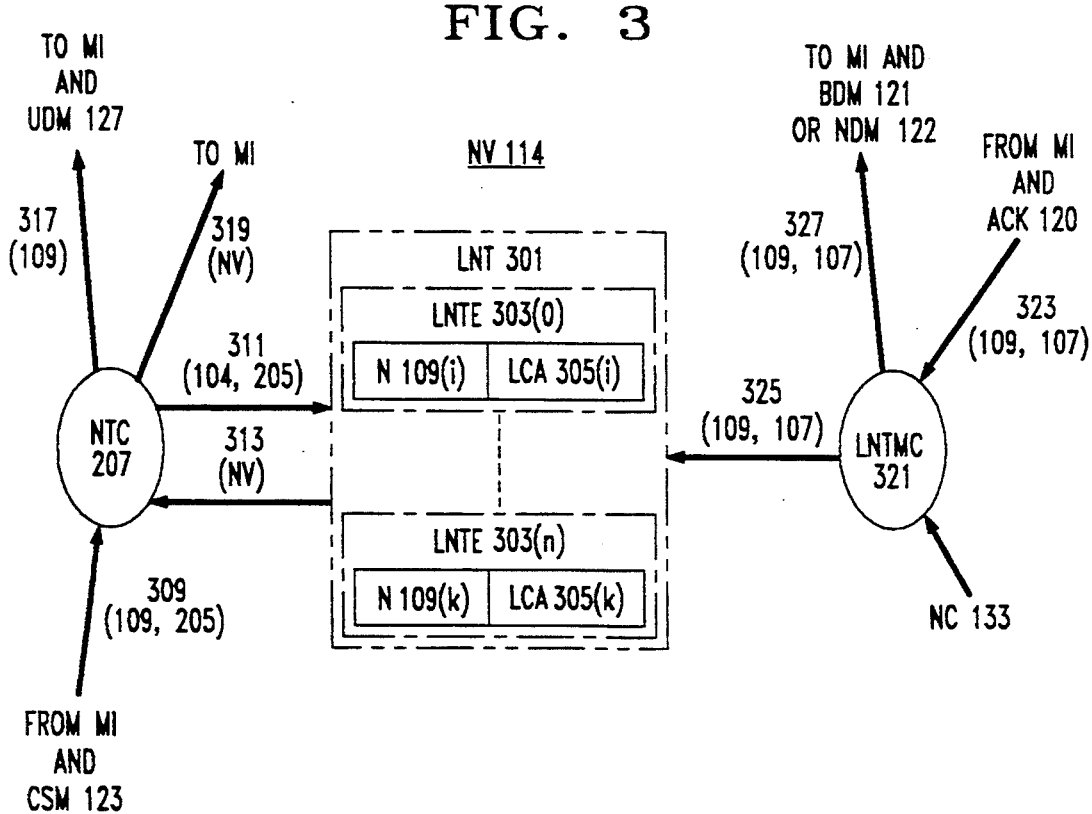

NAME TRANSLATION IN COMMUNICATIONS NETWORKS

BACKGROUND OF THE INVENTION

1. Field of the Invention

The invention concerns name translation generally and more particularly name translation in communications networks.

2. Description of the Prior Art

As networks have grown more complex, it has become more and more worthwhile to give users of the networks techniques for reaching other users which are not dependent on the actual addressing mechanisms used in the networks. One example of such a technique is the 800 number, described in detail in U.S. Pat. No. 4,191,860, Roy P. Weber, *Data Base Communication Call Processing Method,* issued Mar. 4, 1980. The 800 number is not itself an actual telephone number, but instead represents an actual telephone number. When a telephone switch receives an 800 number, it sends a message with the 800 number to a network control point which contains a data base relating the 800 number to an actual telephone number. The network control point returns a message to the switch which contains the actual telephone number corresponding to the 800 number, and the switch then uses the actual number to set up the telephone call. The fact that the 800 number is not an actual telephone number provides a high degree of flexibility: the number may be a mnemonic for the business which is using the 800 number, the business may change its actual telephone number without changing its 800 number, the 800 number may correspond to different actual telephone numbers in different parts of the country or at different times of day, and the 800 number may even correspond to more than one actual telephone number, with calls being divided among the actual telephone numbers according to a load balancing scheme.

Calls made using 800 numbers are already an important part of the business of telephone companies. Moreover, the growing need for portability in the telephone system will make numbers which work like the 800 number even more important. For instance, in the future, each person may be given a single lifetime telephone number which may be used to reach him no matter where he is. As more and more of the numbers used in the telephone system are numbers like 800 numbers, it becomes more and more important that the translation of such numbers to the actual numbers be done as quickly and with as little extra network traffic as possible.

The problem of making the user of a network independent of the addressing mechanisms actually employed in the network is of course encountered in any network. The general solution is to establish a correspondence in the network between a name and a network address. In this context, a network address is a value used internally by the network to address a user of the network and a name is another value which is not itself a network address but represents a network address. In the context of the telephone system, an actual telephone number is a network address and an 800 number is a name. Once the correspondence between the network address and the name is established, a user of the system can provide the network with a name and the network can translate the name into its corresponding network address and then use the network address to establish communications between the user and the desired destination.

The component of the network in which the correspondence between a name and a network address is established is termed a name server. The name server maintains a list of names and their corresponding network addresses. When a node of the network sends the name server a message containing a name, the name server looks the name up in the list and returns a message containing the corresponding network address. In the context of the telephone system, the network control point is a name server for 800 numbers.

As with the telephone network, a critical issue in other networks which employ names is the efficiency of name translation, the translation of a name into the network address which it represents. The simplest way to do name translation is in the manner described above for 800 numbers, i.e., the network address is always obtained from the name server; difficulties with this technique include the time it takes to do a translation and the number of messages required to do it. As regards the time, the switch which has received the name must send the name to the name server and wait until the name server has returned the corresponding network address before it can begin communicating. As regards the number of messages, when a name is used instead of a network address, two extra messages must be sent before the switch can begin communicating.

One technique which has been used in the past to speed up translation is name caches in nodes of the network. In general terms, a name cache contains copies of some of the correspondences between names and network addresses from the name server. When a node receives a name, it looks first in the name cache. If the name cache has a copy of the correspondence between the name and the network address, the node uses the network address from the cache to begin communications; otherwise, it goes to the name server as described above. When the node obtains the corresponding address from the name server, it not only begins communications, but also adds the name and the corresponding address to the name cache. As may be seen from the foregoing, once a name is in the cache, the node can begin communicating without exchanging messages with the name server.

A difficulty with name caches is keeping the name-network address correspondences contained in a cache consistent with the name-network correspondences presently in use in the network. For example, as mentioned above, in an 800 number system, the actual telephone number corresponding to an 800 number may vary according to a load-balancing scheme; when the relationship between the 800 number and the actual telephone number changes in the name server, it must also change in all of the name caches in the network. A prior-an solution to the problem has been to periodically invalidate part or all of the name cache (see for example U.S. Pat. No. 4,706,801, Hart, et al., *Method and Apparatus for Bridging Local Area Networks,* issued Nov. 10, 1987). There, bridges connecting LANs have tables containing source and destination addresses for the stations connected to the LANs. If a bridge does not receive a frame containing one of the values in the table for a period of about 15 minutes, the value is deleted from the table. There are two difficulties with this approach: the first is that an invalid entry may remain in the table for up to fifteen minutes, and may be used by the system during that period. The second is that mere non-use of a source or destination address for a relatively short time may cause the address to be removed from the table. When the source or destination address is again used, it must again be incorporated into the table.

What is needed, and what is provided by the present invention, is a name translation technique which employs name caches, but which avoids the opportunities for error and the excess overhead associated with partial or complete name cache invalidation.

SUMMARY OF THE INVENTION

In one aspect, the invention is a method for determining whether a translation of a name into a network address done in a first node of a network is valid, the method including the steps of:

sending a first message containing at least the name to a second node specified by the network address;

in the second node, determining whether the name corresponds to any network address served by the second node; and when the name does not so correspond, sending a second message indicating that there is no correspondence to the first node.

Other aspects of the invention include the methods employed in the second node for generating the second message and in the first node for responding to the second message, methods for keeping the first and second nodes consistent with the name server, and apparatus for performing name translation in the first node and name verification in the second node. A further aspect of the invention is a generalization of the techniques for use in any situation in which one value is automatically translated into another value.

The foregoing and other objects and advantages of the invention will be apparent to one of ordinary skill in the art who peruses the following Drawing and Detailed Description, wherein:

BRIEF DESCRIPTION OF THE DRAWING

FIG. 2 presents details of name translator 111; and

FIG. 3 presents details of name verifier 114.

Figure 1:
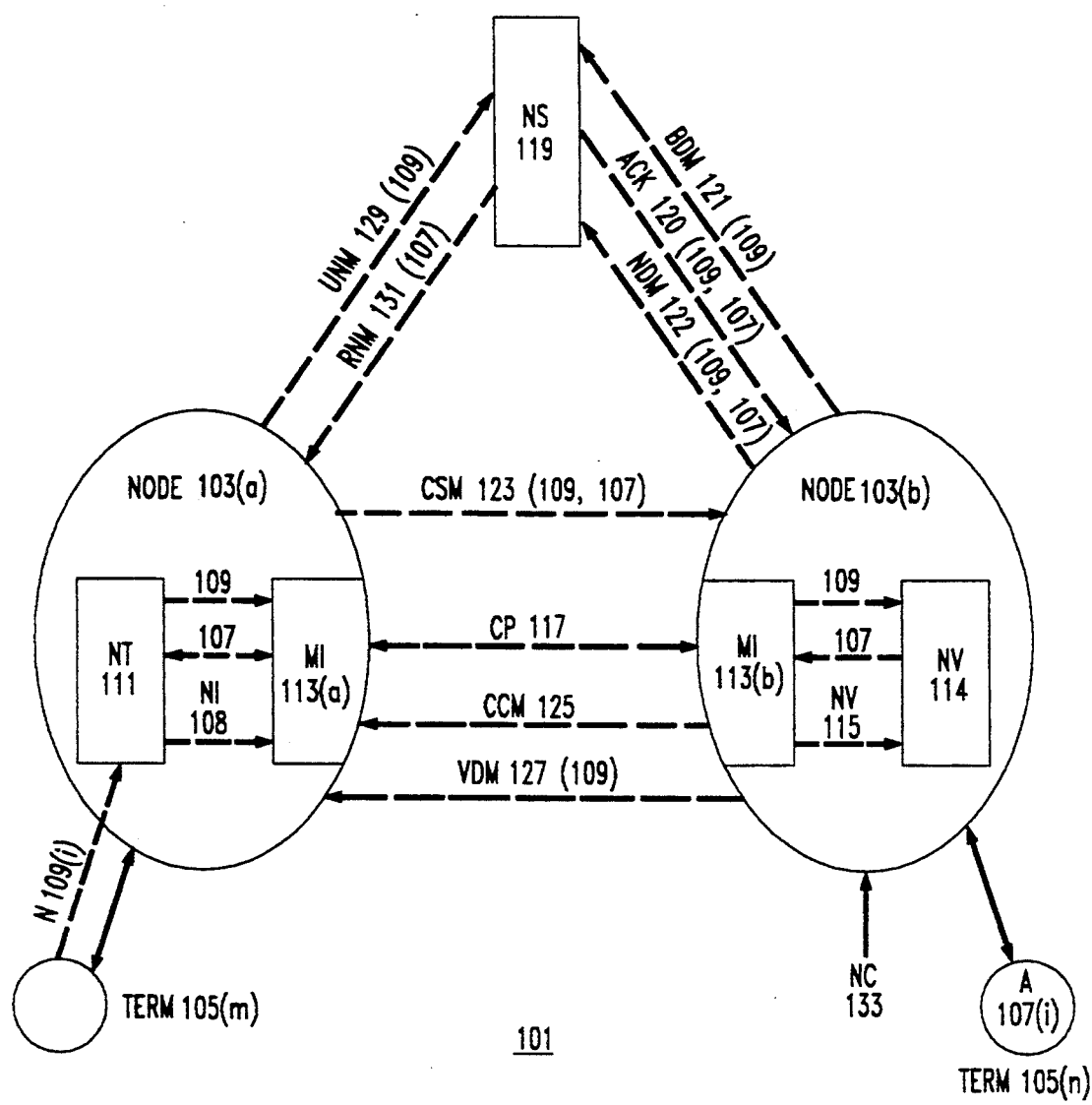
FIG. 1 is an overview of a network in which the invention is employed.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will first present an overview of a network in which the name translation techniques are implemented and of the use of the techniques in the network. Thereupon, it will present details of a presently-preferred implementation of the techniques.

Overview: FIG. 1

FIG. 1 shows a network 101 in which the name translation techniques are implemented. Network 101 is made up of some number of nodes 103, which are connected by a connection path 117. Dashed lines represent messages which move between components of network 101; the messages may move via connection paths 117 or by means of separate communications paths. Each node further has terminals 105 connected to it. Each terminal 105 has a network address 107, by means of which it is addressed in the network. Some or all terminals 105 may also be represented by a name 109. The currently-valid correspondences between names 109 and network addresses 107 are maintained in name server 119, which is accessible to all of the nodes 103 in the network. Network 101 may be understood in concrete terms as a telephone network; in such an embodiment, nodes 103 are switches, terminals 105 are devices such as telephones, names are numbers such as 800 numbers, network addresses are actual telephone numbers, and name server 119 is a data base in a network control point. However, as will be apparent to those of ordinary skill in the art, the techniques described herein are by no means limited to telephone networks, but may be employed in any kind of communications network. For present purposes, only two nodes 103 are interesting: node 103(*a*), which has just received a name 109(*j*) from terminal 105(*m*), and node 103(*b*), which has terminal 105(*n*) whose network address A 107(*i*) currently corresponds to name 109(*j*). In order to better distinguish the two nodes, node 103(*a*) will be termed hereinafter the source node and node 103(*b*) will be termed hereinafter the destination node. In source node 103(*a*), FIG. 1 shows those components which the techniques require in any node 103 which receives names from terminals 105; in destination node 103(*b*), FIG. 1 shows those components which the techniques require in any node 103 which serves network addresses represented by names. In most embodiments, nodes 103 would contain both the components shown in node 103(*a*) and those shown in node 103(*b*).

Both nodes have a message interface 113 Message interface 113 has two functions. First, it responds to other components of the nodes by making messages of the types required by the components and including data provided by the components in the nodes. Second, it responds to messages received in node 103 by providing the data in the messages to the proper components of node 103. The dashed lines of FIG. 1 show the messages which are of interest in the present context. In each case, the name of the message and that part of its contents which is relevant in the present context appear as labels on the dashed lines.

Unknown Name Message (UNM) 129 from source node 103(*a*) to name server 119. The message specifies at least source node 103(*a*) and a name 109 which is unknown to source node 103(*a*).

Resolved Name Message (RNM) 131, which name server 119 sends in response to an unknown name message 129 from a node. The Resolved Name Message 131 contains at least the network address 107 corresponding to the name 109 in the unknown name message to which name server 119 is responding.

Call set-up message (CSM) 123 is a message from a source node 103(*a*) to a destination node 103(*b*) which sets up communication between the nodes. In networks using the name translation techniques described herein, call set-up message 123 includes a name 109 and an address 107 corresponding to the name 109.

Call completion message (CCM) 125 is a message which destination node 103(*b*) sends in response to a call set up message 123. If the source node 103(*a*) can communicate with a terminal accessible to destination node 103(*b*), destination node 103(*b*)

sends the call completion message 125 to the source node 103(a).

Unknown Destination Message (UDM) 127 is a message which destination node 103(b) sends to the source node in response to a call set up message 123 which contains a name 109 for which there is no corresponding network address 107 in the destination node.

Bad Destination Message (BDM) 121 is a message which destination node 103(b) sends to name server 119 to indicate that a correspondence between a name 109 and a network address 107 in name server 119 is no longer valid.

New Destination Message (NDM) 122 is a message which destination node 103(b) sends to name server 119 to announce a new correspondence between a name 109 and a network address 107 to the name server.

Acknowledge Message (ACK) 120 is a message which name server 119 sends to destination node 103(b) in response to a new destination message 122 or a bad destination message 121.

Again, in most embodiments, any node 103 will be capable of sending an unknown name message 129, a bad destination message 121, or a new destination message 122, of receiving a resolved name message 131 or an acknowledge message 120, and of sending or receiving a call set-up message 123, a call completion message 125, or an unknown destination message 127.

Source node 103(a) further includes name translator 111. Name translator 111's function is to attempt to translate a name 109 received from a terminal 105 into a network address 107. If the attempt succeeds, node 103(a) sends a call set up message 123 containing at least the name to destination node 103(b) specified by the network address 107 resulting from the translation. If the attempt fails, node 103(a) sends an unknown name message 129 to name server 119. When name server 119 responds with a resolved name message 131 containing the network address 107 corresponding to the name, source node 103 sends a call setup message 123 as just described and also updates name translator 111 so that the translation will succeed on the next attempt. The dotted arrows connecting name translator 111 and a message interface 113(a) show the flow of information between name translator 111 and message interface 113(a). Name invalid (NI) 108 results when message interface 113 receives an unknown destination message 127.

Destination node 103(b) further includes name verifier 114. Name verifier 114's function is to check whether a name 109 received in a call set up message 123 corresponds to a network address 107 served by destination node 103(b). If the name does correspond, destination node 103(b) sets up a connection to terminal 105 having the network address 107 and sends a call complete message to source node 103(a); if it does not, destination node 103(b) merely sends an unknown destination message to source node 103(a). Again, the dotted arrows between name verifier 114 and message interface 113(b) indicate the flow of data. Name Valid/Invalid (NV) 115 indicates whether a name has been found to correspond to a network address which the node 103(b) serves.

Name translation in network 101 proceeds as follows:
1. When source node 103(a) receives a name 109 from a terminal 105(m), it employs name translator 111 to translate the name 109 into a network address 107.
2. If the translation succeeds, source node 103(a) sends a call set up message 123 to the destination node 103(b) specified in the network address 107 into which the name 109 was translated.
3. If the translation fails, source node 103(a) sends an unknown name message 129 with the name 109 to name server 119; when source node 103(a) receives the resolved name message 131, it sends the call set up message using the network address 107 contained in the resolved name message 131 and adds the name to the set of names which can be translated by name translator 111.
4. When destination node 103(b) receives a call set up message 123 from another node 103 which contains a name 109, it employs name verifier 114 to determine whether destination node 103(b) serves a network address 107 corresponding to the name 109; if it does, it sends a call complete message 125 to the other node 103; otherwise, it sends the unknown destination message 127 to the other node 103 which contains the name 109 for which there was no correspondence.
5. When source node 103(a) receives an unknown destination message 127, it proceeds as described for a failed translation above.

While the foregoing method can deal with the situation where a name 109 no longer corresponds to any address 107 served by the destination node, it cannot handle the situation where the name corresponds to a different address 107 served by the destination node. The latter situation can be dealt with by giving not only name 109 from call set up message 123 to name verifier 114, but also address 107, and having name verifier 114 verify that the name-network address correspondence from call set-up message 123 matches a name-network address correspondence known to name verifier 114.

A fundamental assumption in the procedure just described is that an unknown destination message 127 is produced whenever name verifier 114 cannot verify the name in the call set up message 123. This assumption ensures that network 101 will work correctly even when there are changes in correspondences between names 109 and network addresses 107. An advantageous way of dealing with such changes is the following:
1. A change in a correspondence between a name and a network address 107 is first indicated to the destination node 103(b) for the network address, as indicated by the arrow NC (name change) 133 in FIG. 1. There are two ways in which a correspondence may change: it may be deleted from node 103(b) or it may be added to node 103(b);
2. In the case of a deletion,
   a. node 103(b)
      i. sends a bad destination message 121 with the name 109 and address 107 belonging to the deleted correspondence to name server 119; and
      ii. when node 103(b) receives an acknowledge message 120 with the name 109 and address 107 it removes the correspondence from name verifier 114;
   b. server 119
      i. invalidates the correspondence for the name 109 and address 107 in name server 119 and ceases providing resolved name messages 131 which specify address 107 for name 109 until there is a valid correspondence for the name 109 in name server 119; and ii. sends an acknowledge message 120 with the name 109 and the corresponding address 107 to node 103(*b*); and 3. in the case of an addition,
   a. node 103(*b*)
      i. adds the correspondence to name verifier 114; and
      ii. sends a new destination message 122 with the new correspondence to name server 119;
   b. server 119
      i. adds the new correspondence to name server 119 and again begins providing resolved name messages 131 for the name 109; and
      ii. sends an acknowledge message 120 with the name 109 and the corresponding address 107 to node 103(*b*).

To ensure consistency, name server 119 may require that it has received bad destination message 121 before it will act on a new destination message 122 that changes the name-network address correspondence for the name and may further even require that it have first received message 121 and then message 122.

During the period in which name server 119 is changing a name-network address correspondence, it does not respond to unknown name messages 129 for the name in the correspondence. If node 103(*a*) fails to receive a resolved name message 131 within a reasonable period after it has sent an unknown name message 129, it again sends unknown name message 129. Similarly, if node 103(*b*) sends a bad destination message 121 or a new destination message 122 and receives no acknowledgement message 120 within a reasonable period, it again sends the bad destination or new destination message.

In many cases, the change in correspondence between a name 109 and a network address 107 will involve a change of nodes 103(*b*); in that case, the old correspondence will be deleted from a first node 103(*b*) and a new correspondence will be added to a second node 103(*b*). The first node will then send the bad destination message 121 and the second the new destination message 122. If the change does not involve a change of node, the old correspondence will be deleted from and the new correspondence will be added to the same node and messages 121 and 122 will both be sent from that node.

The above technique works because the old and new destination nodes 103(*b*) will provide unknown destination messages 127 to a source node 103 from the time they change the correspondences in node verifier 114 until the time that the contents of name translator 111 in the source node agree with the contents of name server 119. Any other technique which achieves the same result may also be employed to change correspondences between names 109 and network addresses 107.

Details of Name Translator 111: FIG. 2

FIG. 2 shows details of name translator 111 in a preferred embodiment. The main component of name translator 111 is name cache (NC) 201. Name cache 201 is a set of copies of information from name server 119. In a preferred embodiment, the information includes at a minimum correspondences of names 109 and network addresses 107. Other information which may be associated with a name 109 in name server 119 and in name cache 201 includes billing information and information describing the service associated with the name 109. For example, if different network addresses are valid at different times of the day, the entry may contain a list of the network addresses and the times at which they are valid. A copy of the information for each name 109 is contained Each copy is contained in a name cache entry (NCE) 203 for the name. A name cache entry 203 may further contain information such as a valid bit (not shown) which indicates whether the correspondence between the name and the information in name cache entry 203 is still valid.

Name cache 201 may be contained in memory belonging to a processor in node 203, or it may be implemented in special high-speed cache memory hardware. Implementation of caches is generally well-understood in the art. For example, if the name cache is implemented in general-purpose memory, it can be implemented as a sorted list of names or as a hash table; if it is implemented in special hardware, content-addressable memories may be employed.

The two other components of name translator 111 are made up of code executing on a processor in node 203. The first component, name translation code 207, actually performs translations using name cache 201; the second component, name cache maintenance code 219, keeps the name-network address correspondences in name cache 201 current. Arrows pointing into or out of components 207 and 219 show the flow of data to and from those components. The division between the components in FIG. 2 is logical, i.e., by the function of the component. Depending on the embodiment, the two components may be parts of a single code module or may be contained in separate code modules. The code may further be executed by a single process or task or by a separate process or task for each component. Again, depending on the embodiment, communication between the components may be by means of function invocations or inter-process communications.

Operation of name translator 111 is as follows: when a node 103(*a*) receives a name 109 from a terminal 105(*m*), the name goes to name translation code 207, as shown by arrow 217. Name translation code 207 presents the name 109 to name cache 201, as shown by arrow 209; if there is a valid name cache entry 203 for the name 109, name translation code 207 obtains the corresponding address 205 for the name, as shown by arrow 211. Name translation code 211 then provides the name 109 and the corresponding address 205 to message interface 113(*a*), which uses the name 109 and address 107 in a call set up message 123 for the node 103(*b*) specified by corresponding address 205, as shown by arrows 213 and 215. If there is no valid name cache entry 203 for the name 109, name translation code 207 provides the name to name cache maintenance code 219 (arrow 218).

When name cache maintenance code 219 receives the name from name translation code 207, it provides the name to message interface 113(*a*), which sends an unknown name message 129 containing the name 109 to name server 119 (arrow 225). If there is a name-network address correspondence for the name 109 in name server 119, name server 119 sends a resolved name message 131 to message interface 113(*a*); on receipt of resolved name message 131, message interface 113(*a*) provides at least the corresponding address 205 from the resolved name message to name cache maintenance code 219 (arrow 227). Name cache maintenance code 219 then makes a name cache entry 203 using the name 109 and the corresponding address 205 and places the entry 203 in the proper location in name cache 201 (arrow 221). Thereupon, name cache maintenance code 219 again provides name 109 to name translation code 207 (arrow 217), which again presents it to name cache 201 as previously described. This time, there is an entry 203 for the name 109, and consequently, name translation code 207 provides the name and the address 205 to message interface 113(a), as described above.

The other situation in which name cache maintenance code 219 must maintain name cache 201 is when node 103(a) receives an unknown destination message 127 containing a name 109 and address 107. In that situation, message interface 113(a) provides the name and address to name cache maintenance code 219 (arrow 223), which invalidates name cache entry 203 if the address in the cache equals the address obtained from the unknown destination message and then proceeds in the same fashion as described above for a name received from name translation code 207. As indicated there, after the new name cache entry 203 has been made and placed in name cache 201, the name 109 is again provided to name translation code 207 for translation.

The approach described above for names 109 and network addresses 107 can be used with any information in name cache entry 203 for the name. For example, billing information in name cache entry 203 might be used in a message sent by node 103(a) to a component of network 101 which handles billing; if that component detected that the billing information was incorrect, it could provide an "incorrect billing information" message to node 103(a) to which name cache maintenance code 219 would respond in a fashion similar to that in which it responds to an unknown destination message 127: as in that case, name translator 111 would obtain the correct information from name server 119 (or some other location in the network which contained the information) and update the information in name cache entry 203 for the name. Indeed, the "incorrect billing information" message might itself contain the information needed to update name cache entry 203.

Details of Name Verifier 114: FIG. 3

FIG. 3 shows details of name verifier 114. As is apparent from the figure, name verifier 114 has an overall structure similar to that of name translator 111. The main component is local name table 301, which has a local name table entry 303 for each name 109 which corresponds to a network address (LCA 305) served by node 103 containing name verifier 114. In some embodiments, the entry 305 may contain only the name; in others, it may additionally contain local corresponding address 305 and may further contain a valid bit. Local name table 301 may be implemented using the techniques described for name cache 201. Indeed, since most nodes 103 will contain both a name cache 201 and a local name table 301 and since a node 103 needs to translate names 109 corresponding to local network addresses as well as names 109 corresponding to non-local network addresses, it may be advantageous to implement local name table 301 in whole or in part within name cache 201. In such an implementation, each name cache entry 203 would additionally contain a flag indicating whether it was a local name table entry 303.

The code components of name verifier 114 are name verification code 307, which verifies names 109 received in call set up messages 123, and local name table maintenance code 321, which maintains local name table 301 in response to name changes 133 received in node 103(b). As was the case with name translator 111, the components are functionally distinguished, and may be implemented using the same techniques as described for the code components of name translator 111. Again, arrows show the flow of data.

Operation of name verifier 114 is as follows: when message interface 113 receives a call set up message 123 containing a name 109 and an address 205, it provides at least the name 109 and perhaps also the address 205 to name verification code 307 (arrow 309). Name verification code 307 presents the name 109 to local name table 301 (arrow 311); if there is a local name table entry 303 for the name 109, the name has a corresponding local network address 305. When address 205 is also provided, name verification code 307 not only confirms that there is an entry 303 for the name 109, but also that address 205 matches local corresponding address 305. Both forms of verification are indicated by arrow 3 13.

If the verification of the name 109 is successful, name verification code 07 indicates that fact and transmits address 205 to message interface 113(b) (arrow 319), which responds to the indication by sending a call complete message 125 back to the node 103(a) from which name 109 came. If the verification of the name 109 fails, name verification code 307 provides the name 109 to message interface 113(b) (arrow 317), which sends an unknown destination message 127 containing the name back to the node 103(a) from which name 109 came.

In the embodiment presently being described, local name table maintenance code 321 maintains local name table 301 in response to name changes 133 received in node 103(b). Each name change specifies whether the correspondence for the name 109 is to be deleted from local name table 301 or whether a correspondence for the name 109 is to be added to local name table 301. When a correspondence is to be deleted, only the name need be supplied; when one is to be added, both the name 109 and the network address 107 are necessary. As shown by arrows 325 and 327, local name table maintenance code 321 responds to a name change 133 specifying that a name be deleted by sending a bad destination message 121 containing at least the name and preferably also the address to name server 119 and then, when the proper acknowledgment message 120 is received from name server 119, locating local name table entry 303 for the name and invalidating it. Local name table maintenance code 321 responds to a name change 133 specifying that a name be added by adding a local name table entry 303 for the name and the corresponding network address and then sending a new destination message 122 containing the name and the network address to name server 119. As shown by arrow 323, if the proper acknowledgement message 120 is not received from name server 119, local name table maintenance code 321 again sends the bad destination message 121 or the new destination message 122.

Conclusion

The foregoing Detailed Description has disclosed to one of ordinary skill in the art techniques for determining whether a name translation carried out in a network node is valid and the best mode currently known to the inventor for implementing those techniques. The techniques are examples of a general name translation technique in which the name is first translated using a source which is easily available but may be wrong. The result is then used in a fashion in which a wrong result will be detected, and when a wrong result is detected, the name is again translated using a more reliable but less easily available source.

As will be immediately apparent to those of ordinary skill in the art, the general name translation techniques described herein have uses outside the context of networks and the specific examples given herein may be implemented in networks other than the one disclosed herein. Other implementations of the name translation and name verification components disclosed herein are also possible.

For example, in the disclosed embodiment, a name server is the source of currently-correct correspondences between names and network addresses, the source node responds to an unknown destination message by obtaining the correct correspondence from the name server, and changes in correspondences between names and network addresses are made first in the destination node; in other embodiments, the changes in correspondences may be made first in the namer server and the manner in which changes in correspondences are propagated may be different from what is described herein; further, in some embodiments, there may not be a name server. In such an embodiment, the source node might respond to an unknown destination message by sending a broadcast message to all other nodes to determine which node currently has a network address corresponding to the name, and the node having the corresponding network address might send a message to the broadcasting node. Since there are many possible embodiments of the basic principles of the techniques disclosed herein, the foregoing Detailed Description is to be regarded as being in all respects illustrative and exemplary, and not restrictive, and the scope of the invention disclosed herein is to be determined solely by the appended claims as interpreted in light of the Specification and according to the doctrine of equivalents.

What is claimed is:

1. A method practiced in a network of translating a name which primarily represents a network address of a device in the network into the name's corresponding network address, the network having a name server specifying the currently-valid correspondences between names and network addresses and the method comprising the steps practiced in a first node of:
   using a copy of the name-network address correspondence for the name which may not be currently valid to translate the name into the network address specified in the copy;
   sending a first message containing at least the name from the first node to a second node specified by the network address specified in the copy, the name being sent so that the second node can use the name to determine the validity of the name-network address correspondence specified in the copy;
   receiving a second message from the second node when the name-network address correspondence specified in the copy is not valid;
   responding to the second message by using the name server to obtain the network address for the name from the currently-valid name-network correspondence for the name; and
   updating the copy so that the copy contains the currently-valid name-network address correspondence for the name.

2. The method set forth in claim 1 wherein:
   a correspondence between a name and a network address may change in the second node; the method further includes the step of:
   when a correspondence changes in the second node, sending a third message indicating the change from the second node to the name server; and
   in the name server, responding to the third message by updating the valid correspondences to reflect the change.

3. The method set forth in any of claims 1 or 2 wherein:
   the first message further includes the network address; and the method further includes the step of:
   receiving the second message when the name corresponds to a network address served by the second node but that network address is not the same as the network address included in the first message.

4. The method set forth in any of claims 1 or 2 wherein:
   the second message is received when the name does not correspond to a network address served by the second node.

5. The method set forth in claim 1 wherein:
   the method is practiced in a network wherein the name-network address correspondences are network-wide.

6. A communications network of the type wherein network addresses of devices in the network may be represented by names which primarily represent the network addresses and nodes of the network may exchange messages, the communications network being characterized by:
   a name server accessible to a first one of the nodes which specifies currently-valid correspondences between network addresses and the names that represent the network addresses;
   means in the first node for translating a name into a network address by using a copy of the name-network address correspondence for the name which may not be currently valid and sending a first message including the name to a second one of the nodes which is specified by the network address, the name being sent so that the second node can use the name to determine the validity of the name-network address correspondence specified in the copy; and
   means in the second node responsive to the first message for determining whether the name-network address correspondence specified in the copy is valid and when not, sending a second message indicating that the name-network address correspondence specified in the copy is invalid;
   the means for translating a name responding to the second message by obtaining the network address currently corresponding to the name from the name server and updating the copy so that it specifies the currently-valid name-network address correspondence for the name.

7. The communications network set forth in claim 6 further characterized in that:
   a correspondence between a name and a network address may change in the second node; and
   there are further means in the second node which, when a correspondence changes in the second node, send a third message indicating the change from the second node to the name server; and the name server responds to the third message by establishing the changed correspondence.

8. The communications network set forth in any of claims 6 or 7 further characterized in that:
the first message further includes the network address; and
if the name corresponds to a network address served by the second node, the means responsive to the first message determines whether that network address is the same as the network address included in the first message and sends the second message when that network address is not the same as the network address included in the first message.

9. The apparatus set forth in either of claim 6 or 7 wherein:
the means in the second node responsive to the first message sends the second message when the name does not correspond to any network address served by the second node.

10. The apparatus set forth in claim 6 wherein:
the correspondences specified in the name server are network-wide.

11. Apparatus for use in a first node of a communications network of the type wherein network addresses of network devices may be represented by names which primarily represent the network devices, nodes of the network may exchange messages, and the network includes a name server which specifies currently-valid correspondences between network addresses and the names that represent the network addresses, the apparatus comprising:
means for translating a name into a network address by using a copy of the name-network address correspondence for the name which may not be currently valid and sending a first message including the name to a second node which is specified by the network address, the name being sent so that the second node can use the name to determine the validity of the name-network address correspondence specified in the copy; and
means for responding to a second message from the second node which the second node sends when the name-network address correspondence specified in the copy is not valid by obtaining the network address currently corresponding to the name from the name server and updating the copy so that it specifies the currently-valid name-network address correspondence for the name.

12. The apparatus set forth in claim 11 wherein:
the first message further includes the network address; and
the second message is received when any network address corresponding to the name in the second node is not the same as the network address included in the first message.

13. The apparatus set forth in claim 11 wherein:
the second message is sent when the name does not correspond to a network address served by the second node.

14. The apparatus set forth in claim 11 wherein:
the correspondences specified in the name server are network-wide.

15. A method of obtaining a second value belonging to a second set thereof which currently corresponds to a first value belonging to a first set thereof in a system which maintains means which specify a set of currently-valid correspondences between values belonging to the first set and values belonging to the second set, the values in the first set serving primarily in the system to represent values in the second set and the method comprising the steps of:
using translation means which contains a copy of the correspondence for the first value to obtain a third value, the copy specifying the third value and the copy being one which may not be currently valid;
providing the third value and the first value to means which return an indication of whether the copy is valid, the first value being provided primarily to determine the validity of the copy;
responding to the indication when the indication indicates that the copy is not valid by using the first value to obtain the second value from the means which specify the set of currently-valid correspondences; and
updating the copy to specify the second value instead of the third value.

* * * * *